United States Patent
Hewitt et al.

(10) Patent No.: US 12,423,393 B2
(45) Date of Patent: Sep. 23, 2025

(54) MULTI-FACTOR CAPTCHA WITH ADJUNCT SIGNALS

(71) Applicant: International Business Machines Corporation, Armonk, NY (US)

(72) Inventors: Trudy L. Hewitt, Cary, NC (US); Carolina Garcia Delgado, Zapopan (MX); Jeremy R. Fox, Georgetown, TX (US); Mauro Marzorati, Lutz, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/449,828

(22) Filed: Aug. 15, 2023

(65) Prior Publication Data
US 2025/0061176 A1    Feb. 20, 2025

(51) Int. Cl.
G06F 21/31    (2013.01)

(52) U.S. Cl.
CPC ...... *G06F 21/31* (2013.01); *G06F 2221/2133* (2013.01)

(58) Field of Classification Search
CPC ... G06F 21/31; G06F 2221/2133; G06F 21/36
See application file for complete search history.

(56) References Cited

U.S. PATENT DOCUMENTS

| | | |
|---|---|---|
| 7,721,107 B2 | 5/2010 | Golle |
| 8,495,518 B2 | 7/2013 | Boden |
| 8,656,486 B2 | 2/2014 | Hicks |
| 8,776,173 B2 | 7/2014 | Paxton |
| 9,397,841 B2 | 7/2016 | Godse |
| 9,864,854 B2 | 1/2018 | Mantri |
| 10,057,257 B1 * | 8/2018 | Vendrow ............ H04L 65/1066 |
| 10,097,538 B1 * | 10/2018 | Sanchez ................ G06F 21/44 |
| 10,225,252 B1 * | 3/2019 | Den Boer .............. G06T 11/60 |
| 10,339,334 B2 * | 7/2019 | Sawant ........... H04N 21/25875 |

(Continued)

FOREIGN PATENT DOCUMENTS

| | | | |
|---|---|---|---|
| CN | 105718776 B | 6/2018 | |
| WO | WO-2024123218 A1 * | 6/2024 | ............ G06F 21/32 |

OTHER PUBLICATIONS

Azimpourkivi et al., Camera Based Two Factor Authentication Through Mobile and Wearable Devices, ACM, Sep. 2017 (Year: 2017).*

(Continued)

*Primary Examiner* — David Garcia Cervetti
(74) *Attorney, Agent, or Firm* — Aaron N. Pontikos (57) ABSTRACT

An approach for improving completely automated public turing test to tell computers and humans apart (CAPTCHA) reliability for a resource. The approach receives a request for a CAPTCHA validation from a user. The approach retrieves a CAPTCHA analysis configuration associated with the user. The approach displays a CAPTCHA multi-zone display defined by the configuration. The approach receives video input containing adjunct objects, associated with objects visible on the user, from the user for the multi-zone display. The approach determines if the inputs are valid based on the CAPTCHA analysis configuration. The approach, responsive to the inputs being valid, allows access to the resource.

14 Claims, 3 Drawing Sheets

(56) References Cited

U.S. PATENT DOCUMENTS

| | | | |
|---|---|---|---|
| 10,367,817 B2* | 7/2019 | Ligatti | H04L 63/10 |
| 10,496,809 B1 | 12/2019 | Pham | |
| 10,706,136 B2* | 7/2020 | Cash | G06Q 20/3276 |
| 10,832,485 B1* | 11/2020 | Mantri | G06F 3/017 |
| 10,917,431 B2* | 2/2021 | Turgeman | G06F 21/31 |
| 10,924,476 B2* | 2/2021 | Hecker | G06F 21/32 |
| 11,138,302 B2* | 10/2021 | Figueredo de Santana | G06V 10/764 |
| 11,537,694 B2 | 12/2022 | Greenberger | |
| 12,072,962 B2* | 8/2024 | Markhasin | G06V 40/16 |
| 12,271,462 B1* | 4/2025 | Lyle | H04N 7/15 |
| 2004/0111332 A1* | 6/2004 | Baar | G06T 11/60 705/50 |
| 2008/0066014 A1* | 3/2008 | Misra | G06F 21/36 715/846 |
| 2012/0081282 A1* | 4/2012 | Chin | G06F 3/011 345/156 |
| 2012/0183270 A1* | 7/2012 | Greenblatt | G06F 21/34 386/E5.069 |
| 2012/0222100 A1* | 8/2012 | Fisk | G06F 21/316 726/7 |
| 2012/0323700 A1 | 12/2012 | Aleksandrovich | |
| 2013/0031640 A1* | 1/2013 | Fisk | G06F 21/36 726/28 |
| 2014/0196133 A1* | 7/2014 | Shuster | G06F 21/31 726/7 |
| 2015/0007289 A1* | 1/2015 | Godse | H04L 9/3271 726/7 |
| 2015/0365401 A1* | 12/2015 | Brown | G06F 21/31 726/7 |
| 2016/0359838 A1* | 12/2016 | Dasgupta | H04L 63/08 |
| 2017/0068809 A1* | 3/2017 | Bhosale | G06F 21/32 |
| 2017/0090569 A1* | 3/2017 | Levesque | G06F 21/36 |
| 2017/0098068 A1* | 4/2017 | Mantri | G06F 3/0346 |
| 2017/0104740 A1* | 4/2017 | Hoy | H04L 63/1441 |
| 2017/0161490 A1* | 6/2017 | Fedor | G06F 21/31 |
| 2017/0262863 A1* | 9/2017 | Wells | G06Q 30/0185 |
| 2017/0316191 A1 | 11/2017 | Sipos et al. | |
| 2018/0260822 A1* | 9/2018 | Wells | G06Q 30/0185 |
| 2018/0262505 A1* | 9/2018 | Ligatti | H04L 63/0853 |
| 2018/0310171 A1* | 10/2018 | Whitaker | G06Q 10/00 |
| 2018/0341779 A1* | 11/2018 | Sawant | G06F 21/31 |
| 2018/0373922 A1* | 12/2018 | Yang | G06V 40/10 |
| 2019/0207930 A1* | 7/2019 | Vendrow | H04L 65/1066 |
| 2019/0342329 A1* | 11/2019 | Turgeman | G06F 3/0488 |
| 2019/0377963 A1* | 12/2019 | Hamid | G06V 40/172 |
| 2020/0065459 A1* | 2/2020 | Himabindu | G06F 21/316 |
| 2020/0204541 A1* | 6/2020 | Nair | H04L 63/0853 |
| 2020/0257788 A1* | 8/2020 | Bhattacharyya | G06F 21/31 |
| 2020/0374286 A1* | 11/2020 | Agarwal | G06V 40/20 |
| 2021/0073361 A1* | 3/2021 | Lazzaro | G06F 21/316 |
| 2021/0281572 A1* | 9/2021 | Fernandez-Spadaro | H04L 63/083 |
| 2021/0297422 A1* | 9/2021 | McDorman | H04L 63/107 |
| 2021/0374221 A1* | 12/2021 | Markhasin | G06V 40/70 |
| 2022/0027439 A1 | 1/2022 | Greenberger | |
| 2023/0046380 A1* | 2/2023 | Medvinsky | H04L 63/126 |
| 2023/0230292 A1* | 7/2023 | Ivanov | G06T 19/006 345/633 |
| 2024/0031178 A1* | 1/2024 | Rouse | G06V 10/255 |

OTHER PUBLICATIONS

Liu et al., Dynamic-Hand-Gesture Authentication Dataset and Benchmark, IEEE, Dec. 2020 (Year: 2020).*

Hirakawa et al., Borderless Interface for User Authentication Method Tolerant against Multiple Video-Recording Attacks, IEEE, Dec. 2017 (Year: 2017).*

Lu et al., FMCode: A 3D In-the-Air Finger Motion Based User Login Framework for Gesture Interface, arXiv, Aug. 2018 (Year: 2018).*

"About Face ID advanced technology", Apple Support, downloaded from the Internet Jan. 30, 2023, 5 pages, <https://support.apple.com/en-us/HT208108>.

"Cyber Security Market Size, Share & Trends Report, 2030", Grand View Research, downloaded from the Internet on Jan. 30, 2023, <https://www.grandviewresearch.com/industry-analysis/cyber-security-market>, 15 pages.

IBM, "IBM Security Verify", downloaded from the Internet on Jan. 30, 2023, 11 pages, <https://www.ibm.com/products/verify-identity>.

Chance Miller, "Cybersecurity experts latest to trick Face ID w/ 3D-printed mask & infrared eye cutouts [Video]", available online at <https://9to5mac.com/2017/11/27/face-id-tricked-with-mask-video/>, Nov. 27, 2017, 45 pages.

Cui et al., "A 3-layer Dynamic CAPTCHA Implementation", Second International Workshop on Education Technology and Computer Science, 2010, pp. 23-26.

Cui et al., "A Captcha Implementation Based on 3D Animation", A Captcha Implementation Based on 3D Animation, 2009, pp. 179-182.

Cultofmac, "Control Your iPhone With Your Face—Set Up Switch Control in 7.1 [iOS Tips]", available online at <https://www.cultofmac.com/news/control-iphone-face-set-switch-control-7-1-ios-tips>, Mar. 13, 2014, 8 pages.

Github, "wjcrowcroft/MotionCAPTCHA", available online at <https://web.archive.org/web/20240216114738/https://github.com/wjcrowcroft/MotionCAPTCHA>, Feb. 16, 2024, 4 pages.

Hupperich et al., "Sensor Captchas on the Usability of Instrumenting Hardware Sensors to Prove Liveliness", Aug. 2016, 19 pages.

Shumilov et al., "Gesture-based animated CAPTCHA _ Emerald Insight", available online at <https://www.emerald.com/insight/content/doi/10.1108/ics-12-2014-0082/full/html>, Jul. 11, 2016, 2 pages.

* cited by examiner

MULTI-FACTOR CAPTCHA WITH ADJUNCT SIGNALS

TECHNICAL FIELD

The present invention relates generally to Completely Automated Public Turing test to tell Computers and Humans Apart (CAPTCHA), and specifically, to multi-factor CAPTCHA with adjunct signals.

BACKGROUND

The global cybersecurity market size was valued at USD 167.13 billion in 2020 and is expected to register a CAGR of 10.9% from 2021 to 2028. CAPTCHA is a security mechanism known as question-answer for confirming that a user is a person, i.e., a CAPTCHA mechanism is a test to validate that a user trying to access a resource is a human and not a robot, e.g., an automated computer system.

CAPTCHA employing a facial identity confirmation can be defeated by techniques such as 2-D Pictures, or 3-D photorealistic models. It may even be possible to defeat CAPTCHA with the use of animatronics. A need has developed for an additional layer of CAPTCHA validation to overcome a false facial identification.

BRIEF SUMMARY

According to an embodiment of the present invention, a computer-implemented method for improving completely automated public turing test to tell computers and humans apart (CAPTCHA) reliability for a resource, the computer-implemented method comprising: receiving, by one or more processors, a request for a CAPTCHA validation from a user; retrieving, by the one or more processors, a CAPTCHA analysis configuration associated with the user; displaying, by the one or more processors, a CAPTCHA multi-zone display defined by the configuration; receiving, by the one or more processors, video input containing adjunct objects, associated with objects visible on the user, from the user for the multi-zone display; determining, by the one or more processors, if the inputs are valid based on the CAPTCHA analysis configuration; and responsive to the inputs being valid, allowing, by the one or more processors, access to the resource.

According to an embodiment of the present invention, a computer system for improving completely automated public turing test to tell computers and humans apart (CAPTCHA) reliability for a resource, the computer system comprising: one or more computer processors; one or more non-transitory computer readable storage media; and program instructions stored on the one or more non-transitory computer readable storage media, the program instructions comprising: program instructions to receive a request for a CAPTCHA validation from a user; program instructions to retrieve a CAPTCHA analysis configuration associated with the user; program instructions to display a CAPTCHA multi-zone display defined by the configuration; program instructions to receive video input containing adjunct objects, associated with objects visible on the user, from the user for the multi-zone display; program instructions to determine if the inputs are valid based on the CAPTCHA analysis configuration; and responsive to the inputs being valid, program instructions to allow access to the resource.

According to an embodiment of the present invention, a computer-implemented method for configuring an improved completely automated public turing test to tell computers and humans apart (CAPTCHA) for a resource, the computer-implemented method comprising: recording, by one or more processors, images of one or more hands of a user; recording, by the one or more processors, images of the face of the user; calculating, by the one or more processors, dimensions associated with the one or more hands of the user; calculating, by the one or more processors, dimensions associated with the face of the user; recording, by the one or more processors, movements of the one or more hands of the user; recording, by the one or more processors, movements of the face of the user; recording, by the one or more processors, adjunct objects associated with the user; dividing, by the one or more processors, a display into one or more zones; creating, by the one or processors, avatars associated with the one or more hands and the face; assigning, by the one or more processors, a portion of the movements and associated avatars of the one or more hands, the movements of the face and the associated avatar, and the adjunct objects to zones based on selections by the user; and creating, by the one or more processors, a configuration based on the selection.

According to an embodiment of the present invention, a computer program product for improving completely automated public turing test to tell computers and humans apart (CAPTCHA) reliability for a resource, the computer system comprising: one or more computer processors; one or more non-transitory computer readable storage media; and program instructions stored on the one or more non-transitory computer readable storage media, the program instructions comprising: program instructions to receive a request for a CAPTCHA validation from a user; program instructions to retrieve a CAPTCHA analysis configuration associated with the user; program instructions to display a CAPTCHA multi-zone display defined by the configuration; program instructions to receive video input containing adjunct objects, associated with objects visible on the user, from the user for the multi-zone display; program instructions to determine if the inputs are valid based on the CAPTCHA analysis configuration; and responsive to the inputs being valid, program instructions to allow access to the resource.

According to an embodiment of the present invention, a computer program product for configuring an improved completely automated public turing test to tell computers and humans apart (CAPTCHA) for a resource, the computer program product comprising: one or more computer processors; one or more non-transitory computer readable storage media; and program instructions stored on the one or more non-transitory computer readable storage media, the program instructions comprising: program instructions to record images of one or more hands of a user; program instructions to record images of the face of the user; program instructions to calculate dimensions associated with the one or more hands of the user; program instructions to calculate dimensions associated with the face of the user; program instructions to record movements of the one or more hands of the user; program instructions to record movements of the face of the user; program instructions to record adjunct objects associated with the user; program instructions to divide a display into one or more zones; program instructions to create avatars associated with the one or more hands and the face; program instructions to assign a portion of the movements and associated avatars of the one or more hands, the movements of the face and the associated avatar, and the adjunct objects to zones based on selections by the user; and program instructions to create a configuration based on the selection.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
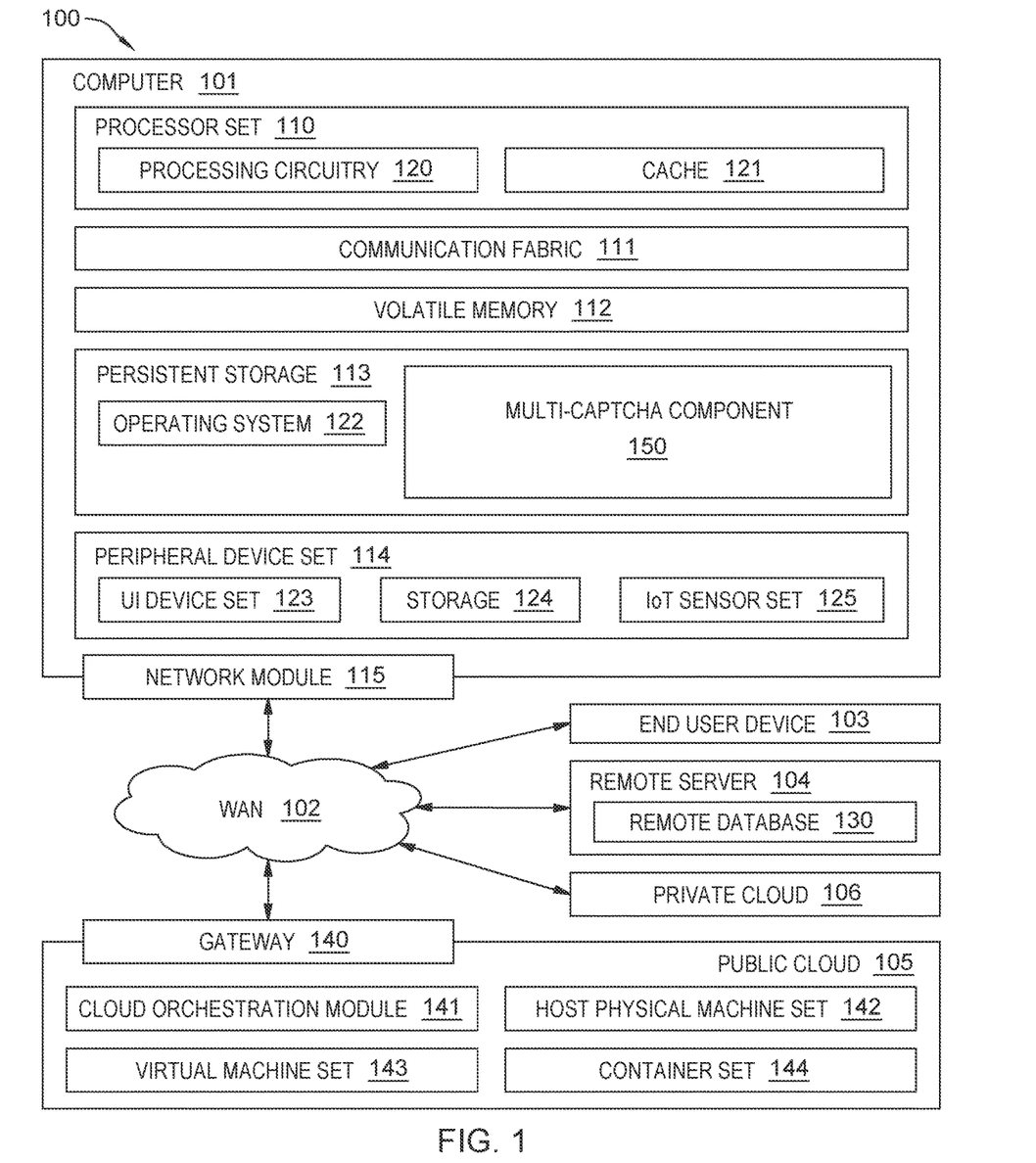
FIG. 1 depicts a cloud computing environment and a high-level architecture, in accordance with at least one embodiment of the present invention.

Looking to FIG. 1, computing environment 100 contains an example of an environment for the execution of at least some of the computer code involved in performing the inventive methods, such as multi-CAPTCHA component 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or Open Source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
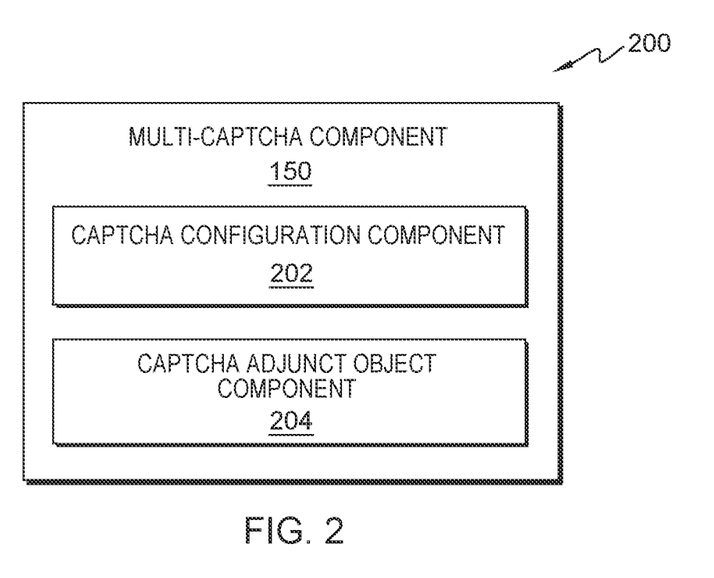
FIG. 2 depicts an exemplary detailed architecture, in accordance with at least one embodiment of the present invention.
Figure 3:
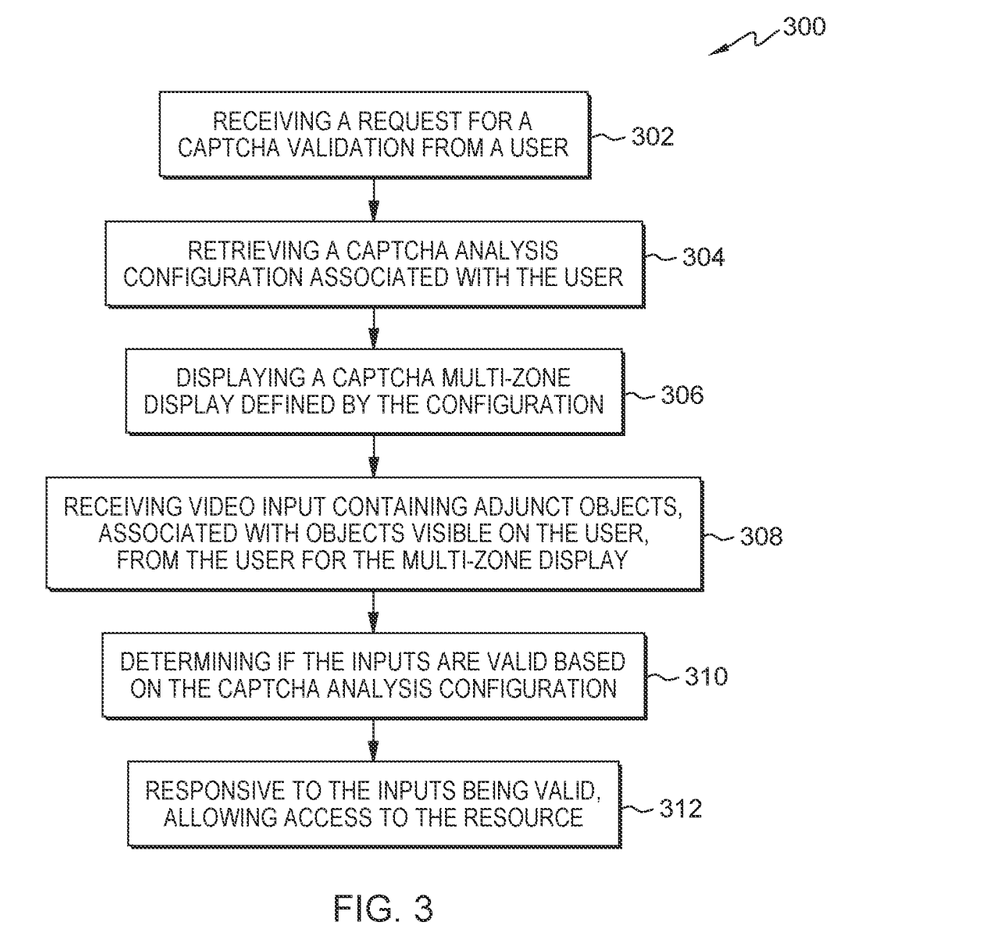
FIG. 3 is a flowchart of a method, in accordance with at least one embodiment of the present invention.

FIG. 2 is an exemplary detailed architecture for performing various operations of FIG. 3, in accordance with various embodiments. The architecture 200 can be implemented in accordance with the present invention in any of the environments depicted in FIG. 1 and FIG. 3, among others, in various embodiments. Of course, more or less elements than those specifically described in FIG. 2 can be included in architecture 200, as would be understood by one of skill in the art upon reading the present descriptions.

Each of the steps of the method 300 (described in further detail below) may be performed by any suitable component of the architecture 200. A processor, e.g., processing circuit(s), chip(s), and/or module(s) implemented in hardware and/or software, and preferably having at least one hardware component, may be utilized in any device to perform one or more steps of the method 300 in the architecture 200. Illustrative processors include, but are not limited to, a central processing unit (CPU), an application specific integrated circuit (ASIC), a field programmable gate array (FPGA), etc., combinations thereof, or any other suitable computing device known in the art.

Architecture 200 provides a detailed view of at least some of the components of multi-CAPTCHA component 150. Architecture 200 can comprise multi-CAPTCHA component 150, which can further comprise CAPTCHA configuration component 202 and CAPTCHA adjunct object component 204.

Embodiments of the present invention, via multi-CAPTCHA component 150, can be applied to environments including, but not limited to, home environments, school environments, office environments, industrial environments, etc. to apply a motion-based mechanism to challenge the supplicant to perform specific facial actions, e.g., wink left eye, smile, frown, nod, or poses, e.g., raising two fingers, wave hello, etc.

In another aspect of an embodiment of the present invention, multi-CAPTCHA component 150 can, as part of a motion and range captcha, evaluate the presence of adjunct objects expected to be present on the body performing the captcha challenge. For example, if the adjunct object is a normal wristwatch wherein the user is instructed to show the back of their hand, which shows the watch face to the phone's camera, and optionally holding up one or more expected finger combinations, e.g., pointer finger, I love you, horns, v-for-victory, etc.

In another aspect of an embodiment of the present invention, Multi-CAPTCHA component 150 can use the watch face's ephemeral info, e.g., current time in either analog or digital format, while in the presence of a user's face as the corroborating piece of validation information. Further if the watch is "smart," signals can be sent to the watch to alter the display e.g., notification text, an animation, etc. can be captured by Multi-CAPTCHA component 150. It should be noted that while a user is performing a motion and range-based captcha, Multi-CAPTCHA component 150 can also evaluate the presence of adjunct objects expected to be present on the body performing the CAPTCHA challenge.

In one aspect of an embodiment of the present invention, CAPTCHA configuration component 202 can provide the capability to execute a calibration process with the video camera of the user device, this process can take forms and dimensions for each finger of the user's hands and structural feature dimensions of the user's face without any movement. For example, CAPTCHA configuration component 202 can measure distances of length and width at different points in each finger of the user's hand. CAPTCHA configuration component 202 can measure distances of length and width at different points in the palm of the user's hand. In another example, CAPTCHA configuration component 202 can measure distances of length and width at different points in the user's face for features such as, but not limited to eyes, mouth, nose, and facial form.

In another aspect of an embodiment of the present invention, CAPTCHA configuration component 202 can request the user to create some hand and facial forms with movements, e.g., close one finger on the right hand, close both eyes, etc. Based on this motion, CAPTCHA configuration component 202 can take again the dimensions of the previous points taken without movement. It should be noted that the dimensions are taken to create a three-dimensional (3D) form avatar, of the fingers and the face of the user, for the login process.

In one aspect of an embodiment of the present invention, CAPTCHA configuration component 202 can request the user to create different zones on the screen. It should be noted that the zones can be defined as horizontal, vertical or a figure like a circle, triangle etc. After the user defines the zones, CAPTCHA configuration component 202 can create avatars for the user's hands, face, etc. It should be noted that these avatars with have the same dimensional points and forms as described above for the user.

In another aspect of an embodiment of the present invention, CAPTCHA configuration component 202 can assign the avatars to the zones based on user assignment of an avatar and zone pairing, i.e., the user will decide which are the items and movements that will be interact in a particular zone. The user will activate the camera and do the movements, but the avatar hands and face will appear in the device zones to validate a request.

In one aspect of an embodiment of the present invention, CAPTCHA adjunct object component 204 can provide motion or range detection CAPTCHA and can also evaluate adjunct ephemeral signals, such as current time of day, recognition of style of wristwatch, etc. In another aspect of an embodiment of the present invention, CAPTCHA adjunct object component 204 can provide the capability to evaluate various types of data collected from, for example a smart watch utilized for adjunct object data push. For example, weather data (conditions), stock tickers, timestamps, and associated geolocation. It should be noted that CAPTCHA adjunct object component 204 can also detect and validate based on observations such as, but not limited to, a predetermined application display on the screen of a smartwatch, an object character recognition (OCR) of text on the screen of a smartwatch matching a predetermined text, a design of bracelet or watch band, matching a predetermined design, etc.

Further, CAPTCHA adjunct object component 204 can provide the capability to validate that the user placed the appropriate avatar in the matching zone based on the previously user established configuration. For example, in the configuration the user elected to divide the device into two zones as horizontal zones and elected to do two movements, just with the hands. Accordingly, CAPTCHA adjunct object component 204 can check the zones, movements, dimensional points, forms, etc., and can validate if the user's validation input matches the data the user provided in the configuration process. It should be noted that the configuration of CAPTCHA items, number of zones, zone sizes, placement of CAPTCHA items in respective zones, etc. is configured by the user before an attempted access.

Looking to an example of embodiments of the present invention, multi-CAPTCHA component 150 can improve validation before access, Jamie has been enjoying working with her new phone as it offers a greater level of security for authentication. She noticed that her old phone was getting confused during authentication with the FaceID step, when Jamie's identical twin, Jill, picked up Jamie's phone. The phone would get confused and Jill would be able to authenticate into Jamie's phone in most instances. Jamie wanted a more secure method for utilizing her FaceID feature.

Accordingly, Jamie turned on the additional multi-factor Captcha with adjunct signal and configured the new feature. First, Jamie setup a "Hook 'em Horns" hand signal. Next, Jamie configured her Smartwatch with an associated application that would be captured within her new phone's field of view when she holds up her "Hook 'em Horns" hand gesture. After configuring multi-CAPTCHA component 150 with these parameters, Jill was no longer successful with accessing Jamie's phone, even though Jill noticed the "Hook 'em Horns" hand gesture and provided it when asked, Jill was not aware, even though she had the same smart watch as Jamie, that multi-CAPTCHA component 150 was also configured to read the screen of Jamie's smart watch. Jamie was comforted knowing not even her identical twin sister could access her phone.

FIG. 3 is an exemplary flowchart of a method 300 for improving completely automated public turing test to tell computers and humans apart (CAPTCHA) reliability for a resource. At step 302, an embodiment can receive, via multi-CAPTCHA component 150, a request for a CAPTCHA validation from a user. At step 304, the embodiment can retrieve, via CAPTCHA configuration component 202, a CAPTCHA analysis configuration associated with the user. At step 306, the embodiment can display, via multi-CAPTCHA component 150, a CAPTCHA multi-zone display defined by the configuration. At step 308, the embodiment can receive, via multi-CAPTCHA component 150, video input containing adjunct objects, associated with objects visible on the user, from the user for the multi-zone display. At step 310, the embodiment can determine, via CAPTCHA adjunct object component 204, if the inputs are valid based on the CAPTCHA analysis configuration. At step 312, the embodiment can, responsive to the inputs being valid, allow, via CAPTCHA adjunct object component 204, access to the resource.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for improving completely automated public turing test to tell computers and humans apart (CAPTCHA) reliability for a resource, the computer-implemented method comprising:
  receiving, by one or more processors, a request for a CAPTCHA validation from a user;
  retrieving, by the one or more processors, a CAPTCHA analysis configuration associated with the user, wherein the CAPTCHA analysis configuration is an expected weather condition associated with the user based on a geolocation of the user;
  receiving, by the one or more processors, video input containing adjunct objects visible in the video input while the user is performing a CAPTCHA challenge, wherein the adjunct objects include weather conditions;
  determining, by the one or more processors, that the video input is valid based on the CAPTCHA analysis configuration, wherein the determining includes matching the weather conditions visible in the video input to expected weather conditions based on the geolocation of the user performing the CAPTCHA challenge; and
  responsive to the video input being valid, allowing, by the one or more processors, access to the resource.

2. The computer-implemented method of claim 1, wherein the adjunct objects further include a watch visible in the video input and matching an image in the CAPTCHA analysis configuration.

3. The computer-implemented method of claim 2, wherein the adjunct objects further include a display on the watch visible in the video input and matching an image in the CAPTCHA analysis configuration.

4. The computer-implemented method of claim 1, wherein one or more adjunct objects are combined with a hand gesture matching an image in the CAPTCHA analysis configuration.

5. The computer-implemented method of claim 1, wherein one or more adjunct objects are combined with a face gesture matching an image in the CAPTCHA analysis configuration.

6. The computer-implemented method of claim 1, wherein a factor of the validation is the user placing adjunct objects in zones matching the CAPTCHA analysis configuration.

7. A computer system for improving completely automated public turing test to tell computers and humans apart (CAPTCHA) reliability for a resource, the computer system comprising:
  one or more computer processors;
  one or more computer readable storage media; and
  program instructions stored on the one or more non-transitory computer readable storage media, the program instructions comprising:
    program instructions to receive a request for a CAPTCHA validation from a user;
    program instructions to retrieve a CAPTCHA analysis configuration associated with the user, wherein the CAPTCHA analysis configuration is an expected weather condition associated with the user based on a geolocation of the user;
    program instructions to receive video input containing adjunct objects visible in the video input while the user is performing a CAPTCHA challenge, wherein the adjunct objects include weather conditions;
    program instructions to determine that the video input is valid based on the CAPTCHA analysis configuration, wherein the determining includes matching the weather conditions visible in the video input to expected weather conditions based on the geolocation of the user performing the CAPTCHA challenge; and
    responsive to the video input being valid, program instruction to allow access to the resource.

8. The computer system of claim 7, wherein the adjunct objects further include a watch visible in the video input and matching an image in the CAPTCHA analysis configuration.

9. The computer system of claim 8, wherein the adjunct objects further include a display on the watch visible in the video input and matching an image in the CAPTCHA analysis configuration.

10. The computer system of claim 7, wherein one or more adjunct objects are combined with a hand gesture matching an image in the CAPTCHA analysis configuration.

11. The computer system of claim 7, wherein one or more adjunct objects are combined with a face gesture matching an image in the CAPTCHA analysis configuration.

12. The computer system of claim 7, wherein a factor of the validation is the user placing adjunct objects and gestures in zones matching the CAPTCHA analysis configuration.

13. A computer program product for improving completely automated public turing test to tell computers and humans apart (CAPTCHA) reliability for a resource, the computer program product comprising:
  one or more computer processors;
  one or more non-transitory computer readable storage media; and
  program instructions stored on the one or more computer readable storage media, the program instructions comprising:
    program instructions to receive a request for a CAPTCHA validation from a user;
    program instructions to retrieve a CAPTCHA analysis configuration associated with the user, wherein the CAPTCHA analysis configuration is an expected weather condition associated with the user based on a geolocation of the user;
    program instructions to receive video input containing adjunct objects visible in the video input while the user is performing a CAPTCHA challenge, wherein the adjunct objects include weather conditions;

program instructions to determine that the video input is valid based on the CAPTCHA analysis configuration, wherein the determining includes matching the weather conditions visible in the video input to expected weather conditions based on the geolocation of the user performing the CAPTCHA challenge; and responsive to the video input being valid, program instruction to allow access to the resource.

14. The computer program product of claim 13, wherein the adjunct objects further include at least one of a watch visible in the video input and matching an image in the CAPTCHA analysis configuration or a display on the watch visible in the video input and matching an image in the CAPTCHA analysis configuration, the adjunct objects combined with a hand gesture matching an image in the CAPTCHA analysis configuration or combined with a face gesture matching an image in the CAPTCHA analysis configuration.

* * * * *